US011703869B2

(12) United States Patent
Beller

(10) Patent No.: US 11,703,869 B2
(45) Date of Patent: Jul. 18, 2023

(54) LATENCY ACCOMMODATION IN TRAJECTORY GENERATION

(71) Applicant: Zoox, Inc., Foster City, CA (US)

(72) Inventor: Andrew E. Beller, San Francisco, CA (US)

(73) Assignee: Zoox, Inc., Foster City, CA (US)

(*) Notice: Subject to any disclaimer, the term of this patent is extended or adjusted under 35 U.S.C. 154(b) by 556 days.

(21) Appl. No.: 16/696,754

(22) Filed: Nov. 26, 2019

(65) Prior Publication Data

US 2021/0157325 A1    May 27, 2021

(51) Int. Cl.
*G05D 1/02* (2020.01)
*G05D 1/00* (2006.01)
*G06V 20/58* (2022.01)

(52) U.S. Cl.
CPC ......... *G05D 1/0214* (2013.01); *G05D 1/0088* (2013.01); *G05D 1/0223* (2013.01); *G06V 20/58* (2022.01); *G05D 2201/0213* (2013.01)

(58) Field of Classification Search
CPC .. G05D 1/0214; G05D 1/0088; G05D 1/0223; G05D 2201/0213; G06V 20/58; B60W 60/001

See application file for complete search history.

(56) References Cited

U.S. PATENT DOCUMENTS

| 10,331,139 B2 | 6/2019 | Takahashi et al. |
| 2019/0079526 A1 | 3/2019 | Vallespi-Gonzalez et al. |
| 2019/0238436 A1* | 8/2019 | Volos ............... H04L 43/0852 |
| 2019/0317519 A1* | 10/2019 | Chen .................... G06V 10/82 |

FOREIGN PATENT DOCUMENTS

WO    WO-2017157913 A1 *  9/2017    ......... B62D 15/0285

OTHER PUBLICATIONS

The PCT Search Report and Written Opinion dated Feb. 4, 2021 for PCT application No. PCT/US20/61262, 10 pages.

* cited by examiner

*Primary Examiner* — Rodney A Butler
(74) *Attorney, Agent, or Firm* — Lee & Hayes, P.C.

(57) ABSTRACT

The described techniques relate to modifying a trajectory of a vehicle, such as an autonomous vehicle, based on a latency associated with one or more systems of the vehicle. In examples, a planning system of the vehicle may predict a future latency (e.g., based on an interval between receipt of sensor data and/or object predictions), and use the future latency to determine a time at which to predict object behavior. Additionally, in some cases, the described techniques may include associating a predetermined acceleration with a predicted future location of the object to create a safety distance around the object, where the predetermined acceleration may be based on a maximum expected acceleration of the object. The safety distance may account for the object potentially accelerating in one or more directions at the future time.

20 Claims, 5 Drawing Sheets

LATENCY ACCOMMODATION IN TRAJECTORY GENERATION

BACKGROUND

Various methods, apparatuses, and systems are utilized by autonomous vehicles to guide such autonomous vehicles through environments including various static and dynamic objects. For instance, autonomous vehicles utilize route planning methods, apparatuses, and systems to guide autonomous vehicles through congested areas with other moving vehicles (autonomous or otherwise), moving people, stationary buildings, etc. In some examples, an autonomous vehicle may make decisions while traversing an environment to ensure safety for passengers and surrounding persons and objects, such as to avoid collisions with objects in the surrounding environment. A variety of sensors may be used to collect information about objects in the surrounding environment, which may be used by the autonomous vehicle to make decisions on how to traverse the environment. Determining trajectories for the autonomous vehicle to follow to prevent collisions with objects that may have an ability to move throughout the environment may, at times, can present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features, in accordance with examples of the disclosure.

DETAILED DESCRIPTION

Figure 1:
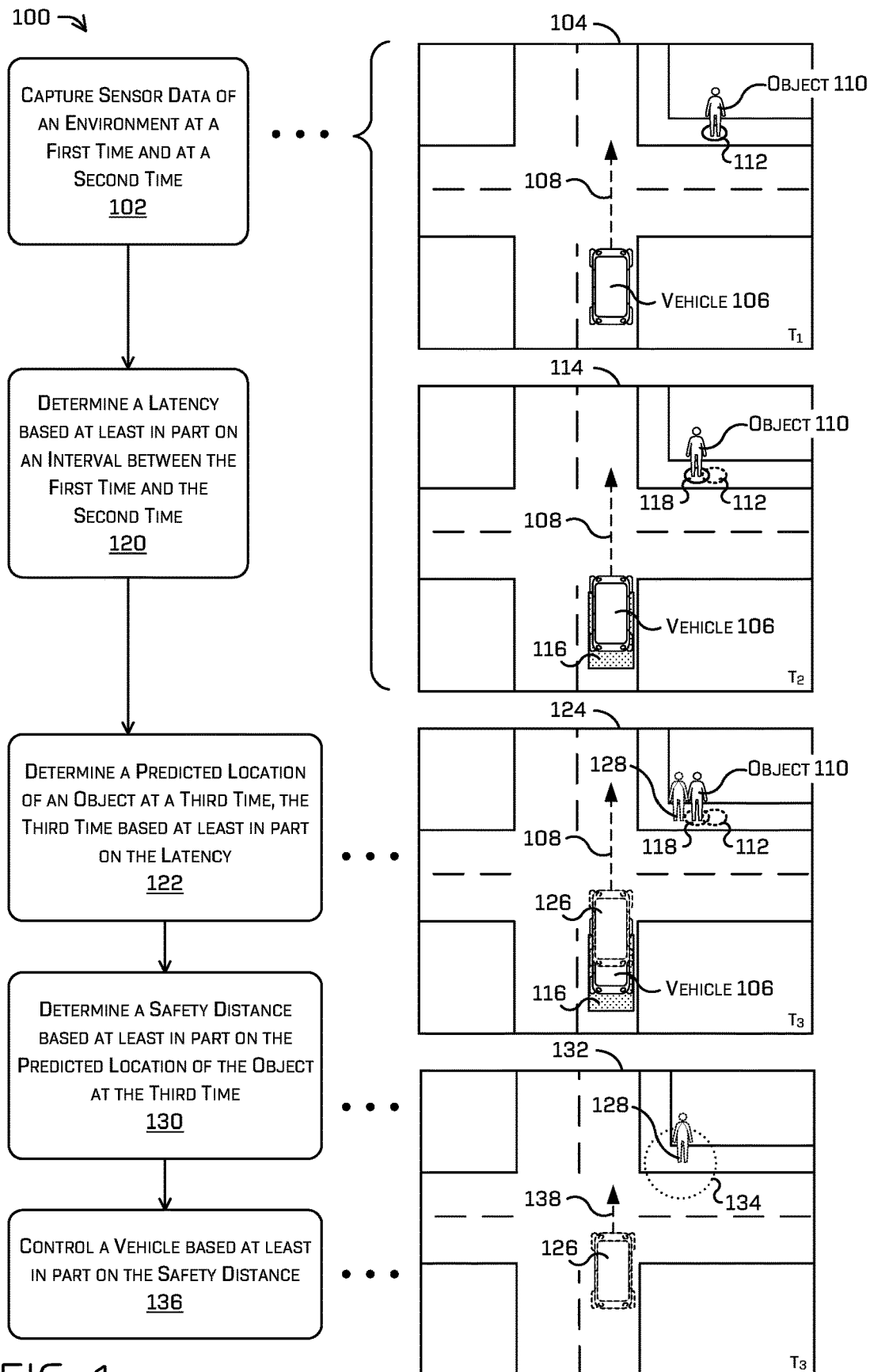
FIG. 1 is a pictorial flow diagram of determining a safety distance based on a predicted location of an object at a future time, where the future time is determined based on a latency of a system, and controlling the autonomous vehicle based on the safety distance, in accordance with examples of the disclosure.

This disclosure relates to generating a trajectory of a vehicle, such as an autonomous vehicle, to avoid a predicted location of an object in the environment at a future time, where the future time may be determined in part on a latency of the system to capture and/or analyze sensor data of the environment. In examples, map data may be used, in part, to generate an initial trajectory for an autonomous vehicle to follow through an environment. The autonomous vehicle may capture sensor data (e.g., lidar, radar, time of flight, and the like) as the autonomous vehicle proceeds through the environment, and may use the sensor data to generate predictions of object behavior. In some examples, the autonomous vehicle may utilize a variety of sensor modalities and algorithms to predict behaviors of objects in an environment surrounding the autonomous vehicle. Predicted behaviors of objects can then be used to generate and refine the autonomous vehicle's trajectory (and/or select an alternate trajectory) as the autonomous vehicle proceeds through the environment. Some examples of generating and/or refining an autonomous vehicle's trajectory may include determining a speed to proceed through the environment, determining when and/or how fast to stop, determining a lane for the autonomous vehicle to use to proceed through the environment, determining whether to yield to an oncoming vehicle, whether to speed up, an amount of space to leave when yielding, and so forth.

In some examples, a latency may exist between what is actually occurring in the environment and instructions being executed by various systems of the autonomous vehicle that control how the autonomous vehicle will follow a trajectory through the environment. As used herein, "latency" refers to a time delay between an input (e.g., sensor detection) and an action (e.g., the autonomous vehicle performing an action such as braking, accelerating, turning, etc.). For instance, a perception system of the autonomous vehicle may receive the sensor data of the environment and use the sensor data to generate predictions of how objects will behave in the environment. The perception system may take some time to generate the predictions of object behavior from the received sensor data, thus introducing some amount of latency into the autonomous vehicle system. Additionally, in some cases, a planning system of the autonomous vehicle may receive the predictions of object behavior from the perception system, and use the predictions to generate a trajectory for the autonomous vehicle to follow through the environment. Similar to the perception system, the planning system may take time to generate the trajectory for the autonomous vehicle to follow through the environment, thus introducing some amount of latency into the autonomous vehicle system. Other instances of latency in the system of the autonomous vehicle are also considered, such as hardware latency, operating system latency, communication latency, audio latency, and/or mechanical latency, to name a few examples.

In some instances, the latency of the autonomous vehicle system(s) may vary from time to time. For example, if the autonomous vehicle encounters an environment with many pedestrians (or other dynamic objects) moving in the environment, the perception system may take longer to generate predictions of behavior of the pedestrians than a scenario with no (or fewer) pedestrians present. Continuing with this example, the planning system of the autonomous vehicle may generate numerous potential trajectories to navigate the environment in consideration of the many pedestrians, and perform a cost analysis to select a safe and efficient trajectory for the autonomous vehicle to follow from the numerous trajectories. The autonomous vehicle may have an increased latency duration in one or both of the perception system and the planner system in the case where dozens of pedestrians are present than a case where no pedestrians are present. Therefore, planning for a predetermined, unchanging latency duration for the autonomous vehicle system may cause inaccurate predictions of future object behavior at an interval associated with the unchanging latency duration.

Therefore, the described techniques predict a future latency (e.g., based on an interval between receipt of sensor data and/or object predictions), and use the future latency to determine a time at which to predict object behavior. Additionally, in some cases, the described techniques may include associating a predetermined acceleration with a predicted future location of the object to create a safety distance around the object, where the predetermined acceleration may be based on a maximum expected acceleration of the object. The safety distance may account for the object potentially accelerating in one or more directions at the future time. Thus, the autonomous vehicle may maneuver more safely, efficiently, and with greater accuracy to prevent a collision with the object than in previous techniques, by accounting for potential acceleration of the object at a particular future time and at a particular future location.

For instance, an autonomous vehicle may capture sensor data of an environment at a first time and at a second time. In some cases, a perception system of the autonomous vehicle may receive the sensor data and use the sensor data to generate predictions of object behavior. For instance, the perception system may use the sensor data to detect an object in the environment. Although reference is made throughout this disclosure as the object being a pedestrian, the techniques described herein are applicable to any other dynamic object, such as vehicles, bicycles, animals, trains, and the like. In some cases, the perception system may determine a location of the object in the environment at a first time and at a second time.

In examples, the perception system may determine a velocity of the object based on a change in location of the object from the first time to the second time, and use the velocity of the object and the location of the object at the second time to predict a future object trajectory. A planning system of the autonomous vehicle may receive information about the object (e.g., the predictions of the object behavior) at spaced intervals, e.g., after the first time and after the second time. In some examples, the perception system and/or the planning system may use the interval between the first time and the second time to determine a latency associated with the autonomous vehicle system. For instance, the latency may be associated with an interval between the planning system receiving the predictions of the object behavior. Additional details regarding latency determination in an autonomous vehicle may be found in U.S. patent application Ser. No. 16/225,997, which is incorporated by reference herein in its entirety.

In some examples, the planning system may use the latency to determine the predicted behavior of the object at a specific time (e.g., a third time) in the future. In one illustrative example, consider a scenario in which the latency associated with the first time and the second time is 0.2 seconds. The planning system may use the determined latency between the first time and the second time to predict a latency for a future, third time. In this case, the planning system may predict the same (or similar) latency, 0.2 seconds, to occur between the second time and the third, future time. Therefore, the planning system may use the predicted behavior of the object (e.g., location, velocity, etc.) received from the perception system to predict a location of the object at the third, future time. While use of one preceding latency is described in this example, other information may be used in addition to the preceding latency, such as an average of multiple preceding latencies, adjustments for predicted increased processing demands (e.g., numerous objects to analyze in the environment) that may increase the latency, and the like.

In some cases, the planning system of the autonomous vehicle may determine a safety distance associated with the object based on the predicted location of the object at the third, future time. For instance, the safety distance may account for potential future movement and/or acceleration by the object in one or more directions. The planning system may use a predetermined acceleration in one or more directions from the third, predicted location of the object to determine the safety distance. For example, in the case of a pedestrian, the planning system may use a maximum acceleration associated with observed pedestrian movement to determine the safety distance, and/or any percentile on a distribution of observed pedestrian movement (e.g., average and/or $50^{th}$ percentile, $95^{th}$ percentile, $99^{th}$ percentile, etc.) to determine the safety distance. The safety distance may account for unforeseen movement by the object, and provide additional time and/or space for the autonomous vehicle to accommodate the object than previous techniques that relied upon predicted location and velocity in a previously observed direction alone.

When determining how to maneuver with respect to the object, the planning system may consider, among many choices, yielding to the object and/or passing around the object. For example, the planning system may use the safety distance to determine whether to yield to the object, and/or an appropriate stopping position to yield to the object. In some cases, the planning system may determine a predicted location of the object at the third time, where the predicted location of the object incorporates a predicted distance covered by the object in a direction of a current trajectory of the autonomous vehicle and accounts for acceleration by the object in the direction of the current trajectory of the autonomous vehicle as well. Using the predicted location of the object, the planning system may establish a stopping position to yield to the object that accommodates movement and potential acceleration by the object in the direction of the autonomous vehicle's trajectory, without an additional update from the perception system in the meantime. Consequently, the autonomous vehicle may yield to the object more conservatively than with previous techniques, even when system latency increases.

As mentioned above, the planning system may use the safety distance to determine a trajectory to follow to pass around the predicted location of the object at the future time. Although passing around an object may occur in instances where the object is moving in a direction of the trajectory of the autonomous vehicle, passing may also occur in situations where the object is moving in other directions as well (e.g., parallel to the trajectory of the autonomous vehicle, away from the trajectory of the autonomous vehicle, etc.). Therefore, the planning system may account for all (or multiple) possible directions of movement and/or acceleration at the third, future time when determining a trajectory to pass around the predicted location of the object. Using the predicted location of the object, the planning system may establish a trajectory to accommodate the possible directions of movement and/or acceleration, without an additional update from the perception system in the meantime. Therefore, the autonomous vehicle may provide a safer trajectory to pass the object (e.g., by increasing a passing distance around the object) as latency increases, thereby executing a desired passing distance relative to the future position of the object rather than the current, measured position relied upon in current techniques.

The techniques discussed herein can improve a functioning of a computing device in a number of ways. As discussed above, the planning component may determine whether to yield to and/or a distance to pass around an object based on a computationally-efficient prediction of object behavior, in between computationally-heavy outputs received from a perception system. The predictions of object behavior that account for system latency can enable the autonomous vehicle to make decisions on how to proceed through the environment earlier and with greater confidence. Additionally, the planning component can provide a more confident trajectory that accounts for predicted object behavior, as the trajectory accommodations provide safety measures based on a maximum acceleration that may be achieved by the object. Consequently, significantly less processing resources are used in comparison to conventional techniques that evaluate multiple predictions of object behavior and/or trajectories for the autonomous vehicle based on the multiple object behavior predictions. In some cases, the described techniques are more accurate than other trajectory generation mechanisms, thus improving safety of the autonomous vehicle and surrounding persons and/or vehicles. For instance, prior systems may have continued along a previous trajectory while waiting for an update from a perception system before updating the trajectory, which could become dangerous in situations where latency between perception outputs increased and time for the planning system to update the trajectory decreased. However, the described techniques account for increased latency in the system, and cause the autonomous vehicle to proceed more conservatively when longer latency is experienced. Accordingly, controlling the vehicle based in part on latency accommodation in trajectory generation can reduce processing resources, by allowing the autonomous vehicle to proceed through the environment more efficiently. By controlling the vehicle based in part on latency accommodation in trajectory generation, the safety of the autonomous vehicle can be improved by making trajectory decisions that account for such latency. Further, techniques for controlling the vehicle based in part on latency accommodation in trajectory generation can increase a confidence that the vehicle can avoid collisions with objects and/or pedestrians by determining the behaviors earlier and with greater accuracy, which may improve safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and is not limited to autonomous vehicles. In one example, similar techniques may be utilized in driver-controlled vehicles in which such a system may provide an indication to a driver of the vehicle of whether it is safe to perform various maneuvers. In another example, the techniques can be utilized in an aviation or nautical context, or in any system involving objects or entity that may be associated with behavior that is unknown to the system. Such techniques may also be used, for example, in the context of manufacturing and assembly to inspect components as they move down an assembly line. Additionally, the techniques described herein can be used with real data (e.g., captured using sensor(s)), simulated data (e.g., generated by a simulator), or any combination of the two.

FIG. 1 is a pictorial flow diagram 100 of determining a safety distance based on a predicted location of an object at a future time, where the future time is determined based on a latency of a system, and controlling the autonomous vehicle based on the safety distance, in accordance with examples of the disclosure.

An operation 102 includes capturing sensor data of an environment at a first time and at a second time. In some examples, a perception system of an autonomous vehicle may receive the sensor data, and use the sensor data to identify objects in the environment, characteristics of the objects (e.g., object type, location, velocity, acceleration, pose, and so forth), and in some cases, may generate predictions associated with the objects based on the identified characteristics. For instance, the perception system may track a location of an object as the object proceeds through the environment from the first time to the second time to determine a velocity of the object.

An example 104 illustrates an environment at a first time $T_1$ in which a vehicle 106 is traversing the environment by following a trajectory 108. The vehicle 106 may collect sensor data while the vehicle 106 traverses the environment, such as lidar data, radar data, time of flight (TOF) data, camera images and/or video, and the like. The trajectory 108 may be generated based on map data, data received from sensors of the vehicle 106, or a combination of map data and sensor data. For the purpose of discussion, a vehicle capturing (or utilizing) the sensor data can be an autonomous vehicle configured to operate according to a Level 5 classification issued by the U.S. National Highway Traffic Safety Administration, which describes a vehicle capable of performing all safety critical functions for the entire trip, with the driver (or occupant) not being expected to control the vehicle at any time. In such an example, since the vehicle 106 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 106 are described throughout this disclosure. In the example 104, the trajectory 108 instructs the vehicle 106 to proceed in a current lane through a junction in the environment. In some examples, the trajectory 108 may include instructions on a speed for the vehicle 106 to proceed through the environment, lane position for the vehicle 106 to occupy, acceleration/deceleration instructions, and the like.

In some cases, the vehicle 106 may determine the presence of an object 110 in the environment based on the sensor data. Additionally, the vehicle 106 may determine a location 112 of the object 110 in the environment at the first time $T_1$. In examples, the object 110 may be a pedestrian located on a sidewalk in the environment, although examples are considered with objects of other object types, and being at different locations in the environment.

An example 114 illustrates the environment at a second time $T_2$, after the time $T_1$. At the time $T_2$, the vehicle 106 has continued to proceed along the trajectory 108 through the junction. A shaded area 116 indicates the prior position of the vehicle at the time $T_1$. Additionally at the time $T_2$, the object 110 has traversed a portion of the environment, in this case, moved along the sidewalk closer to a drivable region occupied by the vehicle 106 from the location 112 to a location 118. The sensors of the vehicle 106 may detect the location 118 of the object 110 at the time $T_2$, and a perception system of the vehicle 106 may determine a velocity of the object 110 based on the change in location of the object 110 from the time $T_1$ to the time $T_2$. In some examples, the perception system of the vehicle 106 may output information regarding analysis of the environment, such as the locations 112 and 118 of the object 110 and/or a velocity associated with the object 110 from the time $T_1$ to the time $T_2$, to a planning system of the vehicle 106 at (or shortly thereafter) the times $T_1$ and $T_2$. For instance, the perception system of the vehicle 106 may output information to the planning system of the vehicle 106 at intervals based on an amount of time it takes the perception system to process the sensor data of the environment.

An operation 120 includes determining a latency based at least in part on an interval between the first time and the second time. As mentioned above, the planning system of the vehicle 106 may receive processed information from the perception system of the vehicle 106 at intervals of time, e.g., based on an amount of time it takes the perception system to process the sensor data of the environment. The planning system may use the interval of time between receipt of two or more batches of information to determine a latency associated with the system, and to predict how long it will take to receive the next batch of information from the perception system. In some cases, the planning system may alter a prediction of how long it will take to receive the next batch of information based on factors such as a number of objects that the perception system is analyzing (e.g., analysis of more objects will take greater processing time), a complexity of the environment (e.g., more possibilities of different object behaviors will take greater processing time), geometry of the drivable region, and so forth. Alternatively or additionally, the planning system may use more than one prior interval to determine a predicted future time that a batch of information will be received from the perception system, such as by averaging multiple prior intervals (e.g., 2 intervals, 3 intervals, 5 intervals, 10 intervals, etc.). Even further, the planning system of the vehicle 106 may take into account latency after a planner output of a trajectory, such as to account for time for various systems to receive, process, and control the vehicle 106 to follow a trajectory.

An operation 122 includes determining a predicted location of an object at a third time, where the third time is based at least in part on the latency. For instance, the planning system of the vehicle 106 may predict that the next batch of information will be received from the perception system at a same (or similar) interval after the time $T_2$ as the interval between the time $T_1$ and the time $T_2$. Alternatively or additionally, the planning system of the vehicle 106 may determine that the latency is likely to increase based on a number of objects in the environment and/or a complexity of the environment as described above, and adjust the predicted time that the next batch of information will be received accordingly. In some examples, the planning system of the vehicle 106 may predict a latency based on multiple previous latencies associated with multiple previous batches of information that the planning system received from the perception system. The planning system of the vehicle 106 may extrapolate information received from the perception system about the object 110 at the times $T_1$ and $T_2$ to predict a location and/or velocity of the object at the predicted future time that the next batch of information will be received from the perception system.

For instance, an example 124 depicts the environment at a time $T_3$, which may be a time in the future (e.g., after the time $T_2$) selected based on the latency determined in operation 120. In some examples, an interval between the time $T_2$ and the time $T_3$ may be the same (or similar) to the interval between the time $T_1$ and the time $T_2$, may be based on an average of multiple previous time intervals, may be increased or decreased from the interval between the time $T_1$ and the time $T_2$ based on number of objects in the environment and/or complexity of the environment, and so forth.

The example 124 depicts the vehicle 106 at a future predicted location 126 as the vehicle 106 follows the trajectory 108 over the time interval from the time $T_2$ to the time $T_3$. Additionally, the example 124 illustrates the object 110 at a future predicted location 128 at the time $T_3$. The planning system may determine the future predicted location 128 of the object 110 based on the location of the object 110 at the time $T_2$, and/or a determined velocity of the object 110 from the time $T_1$ to the time $T_2$. For example, the planning system may determine the future predicted location 128 by assuming that the object 110 will continue in a straight (or generally straight) direction according to the magnitude and direction of the velocity of the object 110 from the time $T_1$ to the time $T_2$. Alternatively or additionally, the planning system may rely upon a predicted trajectory for the object 110 received from the perception system to determine the future predicted location 128.

An operation 130 includes determining a safety distance based at least in part on the predicted location of the object at the third time. In some examples, the planning system of the vehicle 106 may determine the safety distance based on a maximum acceleration associated with an object type of the object 110. For instance, as mentioned above, the perception system may determine a pedestrian object type for the object 110, and supply the pedestrian object type to the planning system. The planning system may determine a maximum acceleration for the pedestrian object type, and apply the maximum acceleration for the pedestrian object type to the future predicted location 128 of the object 110. In some examples, a computing system (associated with the vehicle 106 or otherwise) may determine the maximum acceleration for the pedestrian object type (and/or other object types) by analyzing numerous observations of pedestrians moving throughout the environment. For instance, acceleration associated with a pedestrian object type may be based on the following:

Average pedestrian acceleration: 0.20 m/s$^2$
Standard deviation of pedestrian acceleration: 0.17 m/s$^2$
p95 of pedestrian acceleration: 0.54 m/s$^2$
p99 of pedestrian acceleration: 0.63 m/s$^2$ In some cases, the planning system may use different acceleration rates based on the current location 118 and/or the future predicted location 128 of the object 110. For example, if the object 110 is a pedestrian located in the drivable region, the planning system may utilize the p99 value (e.g., 0.63 m/s$^2$) to determine the safety distance, to account for a possibility of faster acceleration when a pedestrian is in a roadway. Alternatively or additionally, if the object 110 is a pedestrian located outside of the drivable region (e.g., on a sidewalk), the planning system may utilize the p95 value (e.g., 0.54 m/s$^2$) to determine the safety distance, based on more standard pedestrian behavior when not located on a roadway.

In some examples, the planning system may alter the maximum acceleration used to calculate the safety distance to increase the probability of safer outcomes when traversing the environment. For instance, the planning system may apply a safety factor to the selected acceleration rate for the object 110, where the safety factor may be a factor of 1.5, 2, 3, 5, and so on. Continuing with the above example pedestrian object type and acceleration, applying a safety factor of 2 would result in safety distances based on the following accelerations:

2*p95 of pedestrian acceleration: 1.08 m/s$^2$
2*p99 of pedestrian acceleration: 1.26 m/s$^2$ An example 132 depicts the future predicted location 126 of the vehicle 106, and the future predicted location 128 of the object 110 at the time $T_3$ (additional details have been removed from the example 124 for clarity). Additionally, the example 132 illustrates a safety distance 134 surrounding the future predicted location 128 of the object 110. For example, the safety distance 134 may correspond to a uniform acceleration in all, or multiple, directions from the future prediction location 128 of the object 110. The planning system of the vehicle 106 may determine the safety distance 134 based on an object type of the object 110, as discussed above. In the example 132, the safety distance 134 may correspond to 2*p95 of pedestrian acceleration (e.g., 1.08 m/s$^2$) in one, multiple, and/or all directions from the future predicted location 128 of the object 110, based on the object 110 being located outside of the drivable region.

An operation 136 includes controlling a vehicle based at least in part on the safety distance. In some examples, the vehicle 106 may use the safety distance 134 to determine a stop position to yield to the object 110, such that the vehicle 106 does not enter the safety distance 134. As shown in the example 132, the vehicle 106 may update the trajectory 108 to a trajectory 138 to yield to the object 110, e.g., by slowing down and/or stopping to allow the object 110 to pass. In some cases, the vehicle 106 may use the safety distance 134 to determine a trajectory to pass around the object 110, again such that the vehicle 106 circumvents the safety distance 134. Additional details regarding how the trajectory 108 may change based on system latency can be found in the description of FIGS. 2 and 3.

Figure 2:
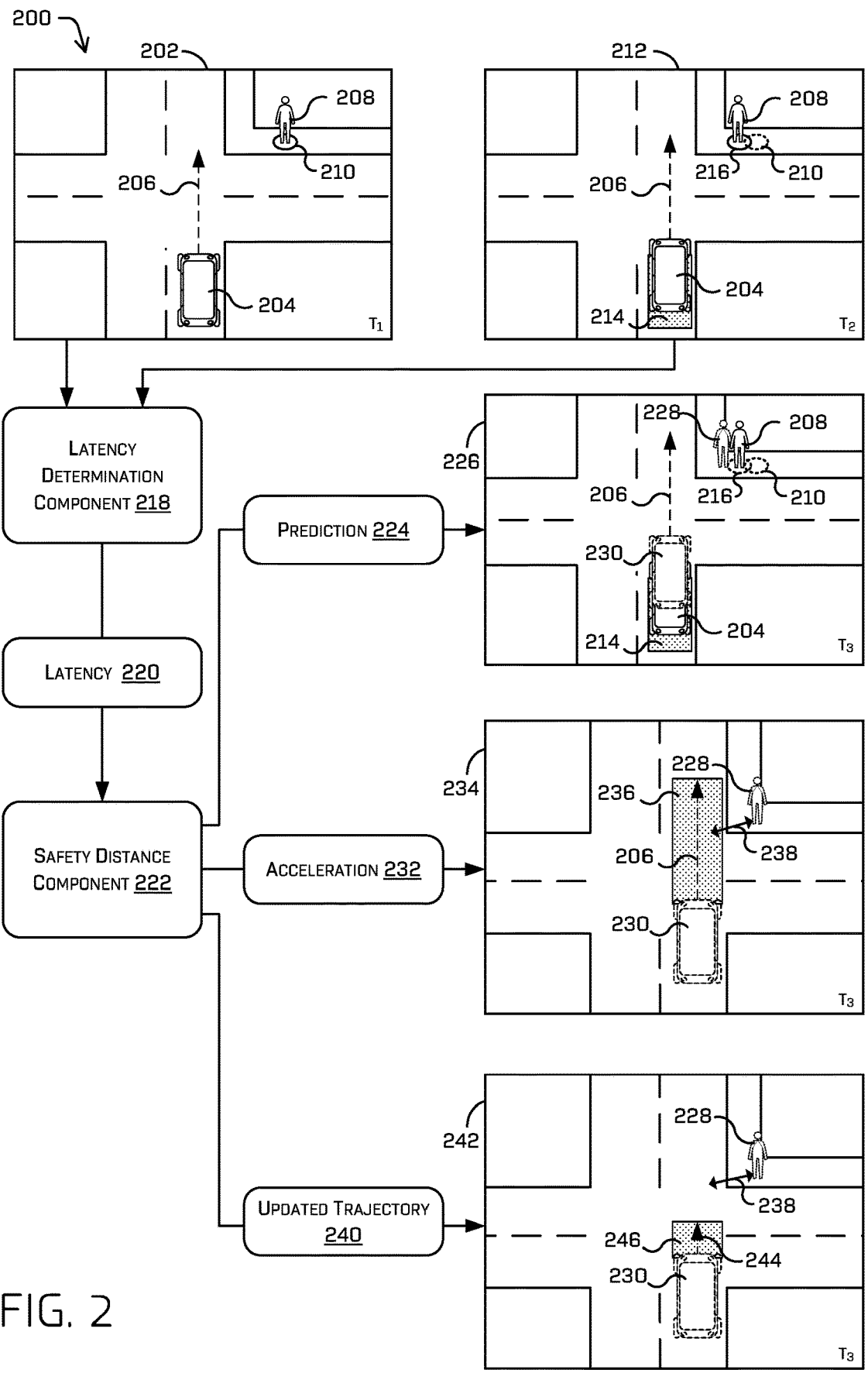
FIG. 2 is an illustration of an example system for updating a trajectory for a vehicle to yield to an object based on a determined latency, in accordance with examples of the disclosure.

FIG. 2 is an illustration of an example system 200 for updating a trajectory for a vehicle to yield to an object based on a determined latency, in accordance with examples of the disclosure.

A first example 202 depicts a vehicle 204 traversing an environment according to a trajectory 206 at a first time $T_1$. In some examples, the vehicle 204 may receive sensor data of the environment, as described herein. For example, the vehicle 204 may detect an object 208 in the environment based on the sensor data. Additionally, in some cases, the vehicle 204 may determine a location 210 of the object 208 at the first time $T_1$ according to the described techniques.

A second example 212 depicts the vehicle 204 continuing along the trajectory 206 to traverse the environment at a second time $T_2$, after the time $T_1$. A shaded area 214 indicates the prior position of the vehicle 204 at the time $T_1$. In some examples, the vehicle 204 may determine a location 216 of the object 208 at the second time $T_2$ according to the described techniques. As shown, the object 208 has moved from the location 210 at the time $T_1$ to the location 216 at the time $T_2$. In some cases, the vehicle 204 may determine a velocity of the object 208 based on the change in location of the object from the time $T_1$ to the time $T_2$.

In some examples, a latency determination component 218 of the vehicle 204 may receive an indication of the first time $T_1$ and the second time $T_2$, which may take the form of time stamps for the first time $T_1$ and the second time $T_2$, and/or a time interval between the first time $T_1$ and the second time $T_2$. The latency determination component 218 may output a latency 220 based at least in part on the indication of the first time $T_1$ and the second time $T_2$. In some cases, the latency determination component 218 may take into account one or more additional time intervals (e.g., prior to the time $T_1$) when determining the latency 220. For instance, the latency determination component 218 may average two or more time intervals (e.g., including the interval between the first time $T_1$ and the second time $T_2$) to determine the latency 220.

A safety distance component 222 may receive the latency 220 and information from sensors of the vehicle 204 regarding the environment and/or the object 208 as detected by the sensors at the first time $T_1$ and the second time $T_2$. In some examples, the safety distance component 222 may use the latency 220 to generate a prediction 224 of behavior of the object 208 at a future time $T_3$. As described herein, the safety distance component 222 may use the latency 220 to determine the future time $T_3$ that the safety distance component 222 expects to receive an additional batch of information about the environment. For instance, the safety distance component 222 may use a same or similar interval as between the first time $T_1$ and the second time $T_2$ to predict the future time $T_3$. In some cases, the safety distance component 222 may alter a predicted time that another batch of information will be received based on based on a number of objects that the vehicle 204 is analyzing (e.g., analysis of more objects will take greater processing time), a complexity of the environment (e.g., more possibilities of different object behaviors will take greater processing time), geometry of the drivable region, and so forth. As discussed above, the safety distance component 222 may extrapolate information received from sensors of the vehicle 204 about the object 208 at the times $T_1$ and $T_2$ to predict a location and/or velocity of the object 208 at the predicted future time $T_3$.

For instance, an example 226 illustrates the prediction 224 generated by the safety distance component 222 regarding a predicted location 228 of the object 208 and a predicted location 230 of the vehicle 204 at the future time $T_3$. The safety distance component 222 may determine the predicted location 228 of the object 208 based on the location of the object 208 at the time $T_2$, and/or a determined velocity of the object 208 from the time $T_1$ to the time $T_2$. For example, the safety distance component 222 may determine the predicted location 228 by assuming that the object 208 will continue in a straight (or generally straight) direction according to the magnitude and direction of the velocity of the object 208 from the time $T_1$ to the time $T_2$.

In some examples, the safety distance component 222 may also determine an acceleration 232 that the object 208 may perform relative to the predicted location 228. Although examples are considered in which the safety distance component 222 determines the acceleration 232 in multiple directions, in some cases, the safety distance component 222 may determine the acceleration 232 in a direction of the trajectory 206 of the vehicle 204. In examples, the safety distance component 222 may determine the acceleration 232 based on an object type of the object 208, as described in relation to FIG. 1.

An example 234 illustrates the acceleration 232 generated by the safety distance component 222 relative to the predicted location 228 of the object 208 at the future time $T_3$. While the example 234 generally corresponds to the example 226, some elements have been removed for clarity. The example 234 illustrates the trajectory 206 that the vehicle 204 has generated to traverse the environment, prior to the outputs by the safety distance component 222, along with a path polygon 236 that represents extents of the vehicle 204 as the vehicle 204 follows the trajectory 206 through the environment. The acceleration 232 is shown as an acceleration 238 in a direction from the predicted location 228 of the object 208 to the path polygon 236, where the acceleration 238 corresponds to a distance that the object 208 may cover based on the acceleration 232. In some cases, the safety distance component 222 may determine that the direction of the acceleration 238 is towards the path of the trajectory 206 based on the velocity of the object 208 from the time $T_1$ to the time $T_2$ (e.g., assuming that the object 208 will continue along a same or similar trajectory). Therefore, the safety distance component 222 may determine that the acceleration 232 may cause the object 208 to intersect the path polygon 236, resulting in a potential collision between the vehicle 204 and the object 208.

To avoid the potential collision, the safety distance component 222 may generate an updated trajectory 240 for the vehicle 204 to yield to the object 208 based on a determination that the acceleration 232 may result in the object 208 entering the path polygon 236 associated with the trajectory 206. In some examples, the updated trajectory 240 may cause the vehicle 204 to reduce speed, and/or may include a stop position at which the vehicle 204 will come to a stop to yield to the object 208.

An example 242 illustrates the updated trajectory 240 generated by the safety distance component 222 relative to the predicted location 230 of the vehicle 204 at the future time $T_3$. While the example 242 generally corresponds to the examples 226 and 234, some elements have been removed for clarity. The example 242 illustrates the updated trajectory 240 as a trajectory 244, with a corresponding path polygon 246 that represents extents of the vehicle 204 as the vehicle 204 follows the trajectory 244. As shown, the trajectory 244 causes the vehicle 204 to yield to the object 208, such that the acceleration 238 by the object 208 from the predicted location 228 does not intersect with the path polygon 246, thus preventing a potential collision between the vehicle 204 and the object 208.

In some examples, the safety distance component 222 may alter the updated trajectory 240 based on the latency 220. For instance, as the latency 220 increases, the distance corresponding to the acceleration 238 may increase as well, thus causing the updated trajectory 240 to circumvent the object 208 at a greater distance. The relationship between the distance corresponding to the acceleration 238 and the updated trajectory 240 may be proportional, exponential, logarithmic, or have any suitable relationship to accommodate potential future acceleration by the object 208.

Figure 3:
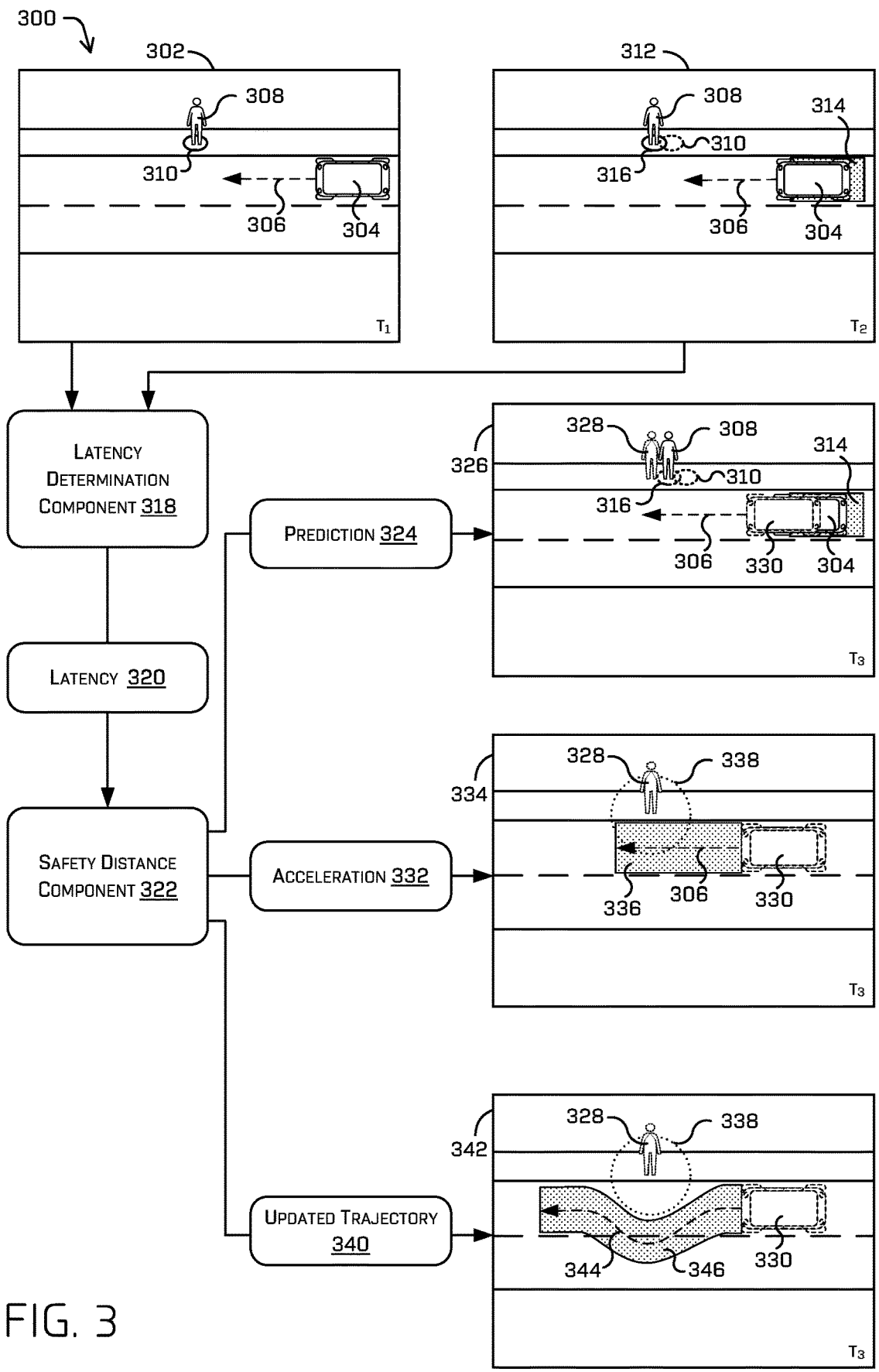
FIG. 3 is an illustration of an example system for updating a trajectory for a vehicle to circumvent a predicted location of an object based on a determined latency, in accordance with examples of the disclosure.

FIG. 3 is an illustration of an example system 300 for updating a trajectory for a vehicle to circumvent a predicted location of an object based on a determined latency, in accordance with examples of the disclosure.

A first example 302 depicts a vehicle 304 traversing an environment according to a trajectory 306 at a first time $T_1$. In some examples, the vehicle 304 may receive sensor data of the environment, as described herein. For example, the vehicle 304 may detect an object 308 in the environment based on the sensor data. Additionally, in some cases, the vehicle 304 may determine a location 310 of the object 308 at the first time $T_1$ according to the described techniques.

A second example 312 depicts the vehicle 304 continuing along the trajectory 306 to traverse the environment at a second time $T_2$, after the time $T_1$. A shaded area 314 indicates the prior position of the vehicle 304 at the time $T_1$. In some examples, the vehicle 304 may determine a location 316 of the object 308 at the second time $T_2$ according to the described techniques. As shown, the object 308 has moved from the location 310 at the time $T_1$ to the location 316 at the time $T_2$. In some cases, the vehicle 304 may determine a velocity of the object 308 based on the change in location of the object from the time $T_1$ to the time $T_2$.

In some examples, a latency determination component 318 (e.g., similar to the latency determination component 218 of FIG. 2) of the vehicle 304 may receive an indication of the first time $T_1$ and the second time $T_2$, which may take the form of time stamps for the first time $T_1$ and the second time $T_2$, and/or a time interval between the first time $T_1$ and the second time $T_2$. The latency determination component 318 may output a latency 320 based at least in part on the indication of the first time $T_1$ and the second time $T_2$. In some cases, the latency determination component 318 may take into account one or more additional time intervals (e.g., prior to the time $T_1$) when determining the latency 320. For instance, the latency determination component 318 may average two or more time intervals (e.g., including the interval between the first time $T_1$ and the second time $T_2$) to determine the latency 320.

A safety distance component 322 (e.g., similar to the safety distance component 222 of FIG. 2) may receive the latency 320 and information from sensors of the vehicle 304 regarding the environment and/or the object 308 as detected by the sensors at the first time $T_1$ and the second time $T_2$. In some examples, the safety distance component 322 may use the latency 320 to generate a prediction 324 of behavior of the object 308 at a future time $T_3$. As described herein, the safety distance component 322 may use the latency 320 to determine the future time $T_3$ that the safety distance component 322 expects to receive an additional batch of information about the environment. For instance, the safety distance component 322 may use a same or similar interval as between the first time $T_1$ and the second time $T_2$ to predict the future time $T_3$. In some cases, the safety distance component 322 may alter a predicted time that another batch of information will be received based on based on a number of objects that the vehicle 304 is analyzing (e.g., analysis of more objects will take greater processing time), a complexity of the environment (e.g., more possibilities of different object behaviors will take greater processing time), geometry of the drivable region, and so forth. As discussed above, the safety distance component 322 may extrapolate information received from sensors of the vehicle 304 about the object 308 at the times $T_1$ and $T_2$ to predict a location and/or velocity of the object 308 at the predicted future time $T_3$.

For instance, an example 326 illustrates the prediction 324 generated by the safety distance component 322 regarding a predicted location 328 of the object 308 and a predicted location 330 of the vehicle 304 at the future time $T_3$. The safety distance component 322 may determine the predicted location 328 of the object 308 based on the location of the object 308 at the time $T_2$, and/or a determined velocity of the object 308 from the time $T_1$ to the time $T_2$. For example, the safety distance component 322 may determine the predicted location 328 by assuming that the object 308 will continue in a straight (or generally straight) direction according to the magnitude and direction of the velocity of the object 308 from the time $T_1$ to the time $T_2$.

In some examples, the safety distance component 322 may also determine an acceleration 332 that the object 308 may perform relative to the predicted location 328. Although examples are considered in which the safety distance component 322 determines the acceleration 332 in a single direction (e.g., in a direction of the trajectory 306), in some cases, the safety distance component 322 may determine the acceleration 332 in multiple directions relative to the predicted location 328. In examples, the safety distance component 322 may determine the acceleration 332 based on an object type of the object 308, as described in relation to FIG. 1.

An example 334 illustrates the acceleration 332 generated by the safety distance component 322 relative to the predicted location 328 of the object 308 at the future time $T_3$. While the example 334 generally corresponds to the example 326, some elements have been removed for clarity.

The example 334 illustrates the trajectory 306 that the vehicle 304 has generated to traverse the environment, prior to the outputs by the safety distance component 322, along with a path polygon 336 that represents extents of the vehicle 304 as the vehicle 304 follows the trajectory 306 through the environment. The acceleration 332 is shown as an acceleration area 338 in multiple directions, e.g., a circle having a radius originating from the predicted location 328 of the object 308 outward in all and/or multiple directions, where the radius corresponds to a distance that the object 308 may cover based on the acceleration 332. In some cases, the safety distance component 322 may determine that the acceleration 332 may cause the object 308 to intersect the path polygon 336, as indicated by the acceleration area 338 intersecting the path polygon 336, resulting in a potential collision between the vehicle 304 and the object 308.

To avoid the potential collision, the safety distance component 322 may generate an updated trajectory 340 for the vehicle 304 to circumvent the object 308 based on a determination that the acceleration 332 may result in the object 308 entering the path polygon 336 associated with the trajectory 306. In some examples, the updated trajectory 340 may cause the vehicle 304 to travel around the acceleration area 338, such as by changing lanes, changing lane position, and/or altering a route to the destination.

An example 342 illustrates the updated trajectory 340 generated by the safety distance component 322 relative to the predicted location 330 of the vehicle 304 at the future time $T_3$. While the example 342 generally corresponds to the examples 326 and 334, some elements have been removed for clarity. The example 342 illustrates the updated trajectory 340 as a trajectory 344, with a corresponding path polygon 346 that represents extents of the vehicle 304 as the vehicle 304 follows the trajectory 344. As shown, the trajectory 344 causes the vehicle 304 to circumvent the acceleration area 338, such that the acceleration area 338 surrounding the predicted location 328 of the object does not intersect with the path polygon 346, thus preventing a potential collision between the vehicle 304 and the object 308.

In some examples, the safety distance component 322 may alter the updated trajectory 340 based on the latency 320. For instance, as the latency 320 increases, the size of the acceleration area 338 may increase as well, thus causing the updated trajectory 340 to circumvent the object 308 at a greater distance. The relationship between the radius of the acceleration area 338 and the updated trajectory 340 may be proportional, exponential, logarithmic, or have any suitable relationship to accommodate potential future acceleration by the object 308.

Figure 4:
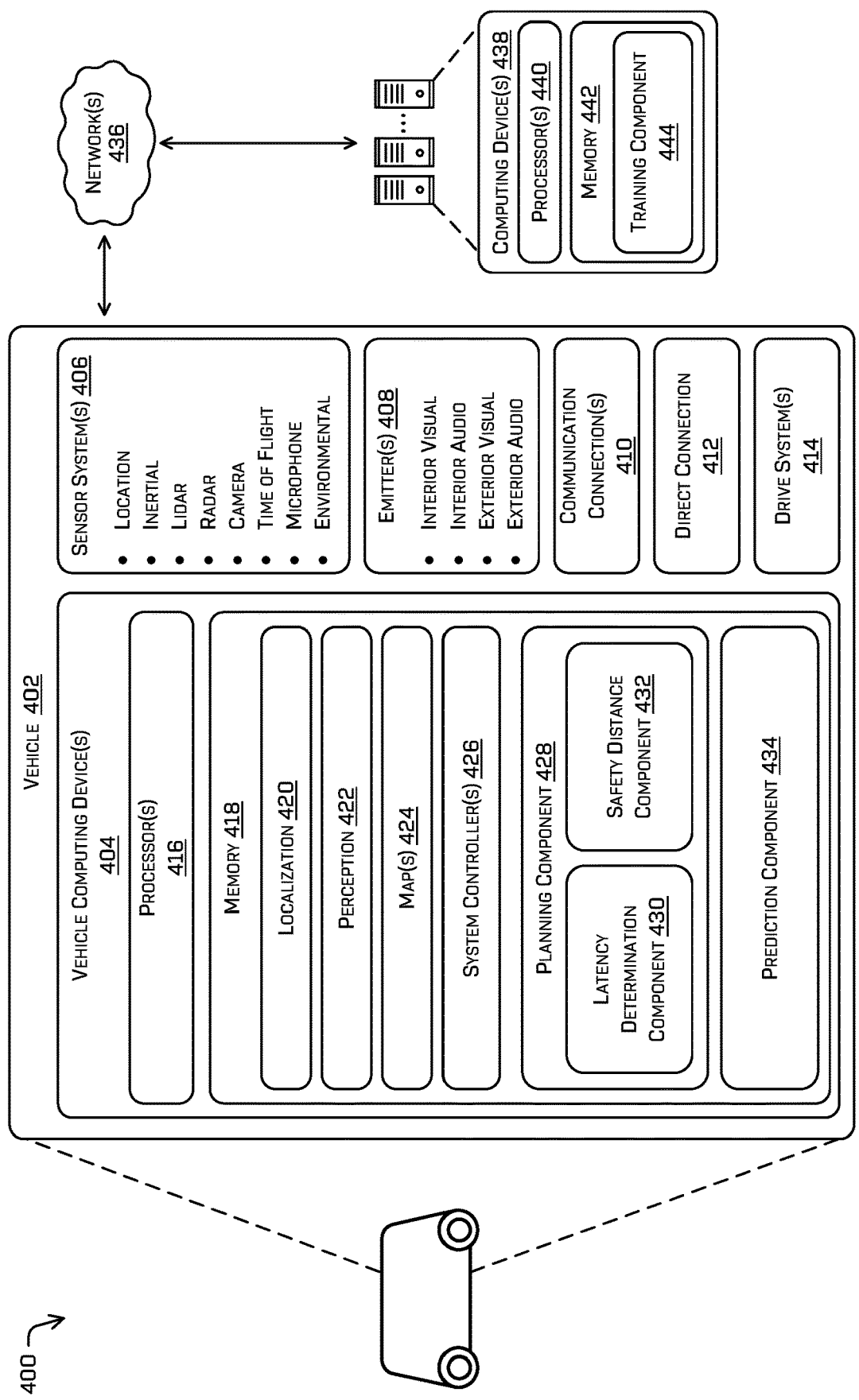
FIG. 4 depicts a block diagram of an example system for implementing the techniques described herein.

FIG. 4 depicts a block diagram of an example system 400 for implementing the techniques described herein. In at least one example, the system 400 can include a vehicle 402, such as an autonomous, semi-autonomous, or manually controlled vehicle.

The vehicle 402 can include vehicle computing device(s) 404, one or more sensor systems 406, one or more emitters 408, one or more communication connections 410, at least one direct connection 412, and one or more drive systems 414.

The vehicle computing device(s) 404 can include one or more processors 416 and memory 418 communicatively coupled with the one or more processors 416. In the illustrated example, the vehicle 402 is an autonomous vehicle; however, the vehicle 402 could be any other type of vehicle or robotic platform. In the illustrated example, the memory 418 of the vehicle computing device(s) 404 stores a localization component 420, a perception component 422, one or more maps 424, one or more system controllers 426, a planning component 428, a latency determination component 430, a safety distance component 432, and a prediction component 434. Though depicted in FIG. 4 as residing in the memory 418 for illustrative purposes, it is contemplated that the localization component 420, the perception component 422, the one or more maps 424, the one or more system controllers 426, the planning component 428, the latency determination component 430, the safety distance component 432, and the prediction component 434 can additionally, or alternatively, be accessible to the vehicle 402 (e.g., stored on, or otherwise accessible by, memory remote from the vehicle 402).

In at least one example, the localization component 420 can include functionality to receive data from the sensor system(s) 406 to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the autonomous vehicle within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 420 can provide data to various components of the vehicle 402 to determine an initial position of an autonomous vehicle for generating a trajectory, for determining to retrieve map data, and so forth, as discussed herein.

In some instances, the perception component 422 can include functionality to perform object detection, segmentation, and/or classification. In some examples, the perception component 422 can provide processed sensor data that indicates a presence of an entity that is proximate to the vehicle 402 and/or a classification of the entity as an entity type (e.g., car, truck, pedestrian, cyclist, animal, building, tree, road surface, curb, sidewalk, stoplight, stop sign, lane marker, unknown, etc.). In additional or alternative examples, the perception component 422 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In those examples in which perception component 422 performs detection, the perception component 422 may output detections of objects in an image. Such detections may comprise two-dimensional bounding boxes and/or masks of detected objects. In some examples, such detection may utilize a machine learning approach (e.g., scale-invariant feature transform (SIFT), histogram of oriented gradients (HOG), etc.) followed by a support vector machine (SVM) to classify objects depicted in images received from a camera of the sensor system 406. Alternatively or additionally, detection may utilize a deep learning approach based on a convolutional neural network (CNN) to classify objects depicted in images received from a camera of the sensor system 406. As described herein, the perception component 422 may output detections of objects and/or other processed sensor data to the planning component 428 at intervals, thus allowing the planning component 428 to make object predictions and/or generate a trajectory for the vehicle 402 to follow to traverse the environment.

The memory 418 can further include one or more maps 424 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 424 can include at least one map (e.g., images and/or a mesh). In some examples, the vehicle 402 can be controlled based at least in part on the maps 424. That is, the maps 424 can be used in connection with the localization component 420, the perception component 422, the planning component 428, and/or the prediction component 434, to determine a location of the vehicle 402, identify objects in an environment, and/or generate routes and/or trajectories to navigate within an environment.

In some examples, the one or more maps 424 can be stored on a remote computing device(s) (such as the computing device(s) 440) accessible via network(s) 438. In some examples, multiple maps 424 can be stored based on, for example, a characteristic (e.g., type of entity, time of day, day of week, season of the year, etc.). Storing multiple maps 424 can have similar memory requirements, but increase the speed at which data in a map can be accessed. In some examples, the one or more maps 424 can store sizes or dimensions of objects associated with individual locations in an environment. For example, as the vehicle 402 traverses the environment and as maps representing an area proximate to the vehicle 402 are loaded into memory, one or more sizes or dimensions of objects associated with a location can be loaded into memory as well. In some examples, the one or more maps 424 may include junction extent information, lane merge locations, and the like as described herein.

The prediction component 434 can generate predictions of object behavior based at least in part on sensor data received form the sensor system 406. For example, the prediction component 434 may generate one, or multiple, predicted trajectories for an object detected in the environment. Additionally, in some cases, the prediction component 434 can determine variances in position, location, speed, acceleration, and the like for each predicted trajectory generated for a particular object. The prediction component 434 may output the predicted trajectories to the planning component 428 (e.g., at intervals) to use in generating a trajectory for the vehicle 402 to follow to traverse the environment, as described herein.

In general, the planning component 428 can determine a path for the vehicle 402 to follow to traverse the environment. For example, the planning component 428 can determine various routes and trajectories and various levels of detail. For example, the planning component 428 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 428 can generate an instruction for guiding the autonomous vehicle along at least a portion of the route from the first location to the second location. In at least one example, the planning component 428 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 402 to navigate.

In some instances, the planning component 428 can generate one or more trajectories for the vehicle 402 based at least in part on a safety distance associated with an object, where the one or more trajectories may include a yield trajectory and/or a trajectory to circumvent the safety distance associated with the object, as discussed herein. In some examples, the planning component 428 can use temporal logic, such as linear temporal logic and/or signal temporal logic, to evaluate one or more trajectories of the vehicle 402.

The latency determination component 430 may receive information regarding the environment surrounding the vehicle 402 in batches from the perception component 422 and/or the prediction component 434. In some cases, the latency determination component 430 may receive the batches at intervals based on an amount of time that the perception component 422 and/or the prediction component 434 take to process each batch of data. In some examples, the latency determination component 430 may determine a system latency based at least in part on an interval between two (or more) batches of data received from the perception component 422 and/or the prediction component 434. Further, the latency determination component 430 may predict a future time that the planning component 428 will receive a subsequent batch of information from the perception component 422 and/or the prediction component 434 based on the latency. The latency determination component 430 may alter the predicted future time based on a number of objects that the perception component 422 is analyzing (e.g., analysis of more objects will take greater processing time), a complexity of the environment (e.g., more possibilities of different object behaviors will take greater processing time), geometry of the drivable region, and so forth.

The safety distance component 432 may also receive the batches of information from the perception component 422 and/or the prediction component 434. The safety distance component 432 may use the information to generate a trajectory for the vehicle 402 to follow to traverse the environment based, in part, on the latency and/or the predicted future time that a batch of information will be received from the perception component 422 and/or the prediction component 434. In some examples, the safety distance component 432 may predict a location of an object at the predicted future time that the batch of information will be received from the perception component 422 and/or the prediction component 434, e.g., based on a current location and/or velocity of the object. The safety distance component 432 may determine a safety distance for the object based on a predetermined maximum acceleration for an object type of the object. In some examples, the safety distance component 432 may generate a trajectory for the vehicle 402 that yields to the object based on a determination that a trajectory of the object is in a direction of the current trajectory of the vehicle 402. Alternatively or additionally, the safety distance component 432 may generate a trajectory for the vehicle 402 that circumvents the object, such as in a case where the vehicle 402 and the object are on parallel trajectories.

In at least one example, the vehicle computing device(s) 404 can include one or more system controllers 426, which can be configured to control steering, propulsion, braking, safety, emitters, communication, and other systems of the vehicle 402. These system controller(s) 426 can communicate with and/or control corresponding systems of the drive system(s) 414 and/or other components of the vehicle 402.

As can be understood, the components discussed herein (e.g., the localization component 420, the perception component 422, the one or more maps 424, the one or more system controllers 426, the planning component 428, the latency determination component 430, the safety distance component 432, and the prediction component 434) are described as divided for illustrative purposes. However, the operations performed by the various components can be combined or performed in any other component. By way of example, functions described in relation to the planning component 428, the latency determination component 430, the safety distance component 432, and/or the prediction component 434 may be performed by the perception component 422 to reduce the amount of data transferred by the system.

In at least one example, the sensor system(s) 406 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the lidar sensors can include individual lidar sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device(s) 404. Additionally or alternatively, the sensor system(s) 406 can send sensor data, via the one or more networks 436, to the one or more computing device(s) at a particular frequency, after a lapse of a predetermined period of time, in near real-time, etc.

The vehicle 402 can also include one or more emitters 408 for emitting light and/or sound, as described above. The emitters 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive system(s) 414. Also, the communication connection(s) 410 can allow the vehicle to communicate with other nearby computing device(s) (e.g., other nearby vehicles, traffic signals, etc.). The communication connection(s) 410 also enable the vehicle 402 to communicate with a remote teleoperations computing device or other remote services.

The communication connection(s) 410 can include physical and/or logical interfaces for connecting the vehicle computing device(s) 404 to another computing device or a network, such as network(s) 436. For example, the communications connection(s) 410 can enable Wi-Fi-based communication such as via frequencies defined by the IEEE 802.11 standards, short range wireless frequencies such as Bluetooth®, cellular communication (e.g., 2G, 3G, 4G, 4G LTE, 4G, etc.) or any suitable wired or wireless communications protocol that enables the respective computing device to interface with the other computing device(s).

In at least one example, the vehicle 402 can include one or more drive systems 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor systems to detect conditions of the drive system(s) 414 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 414. Furthermore, the drive system(s) 414 also include one or more communication connection(s) that enable communication by the respective drive system with one or more other local or remote computing device(s).

In at least one example, the direct connection 412 can provide a physical interface to couple the one or more drive system(s) 414 with the body of the vehicle 402. For example, the direct connection 412 can allow the transfer of energy, fluids, air, data, etc. between the drive system(s) 414 and the vehicle. In some instances, the direct connection 412 can further releasably secure the drive system(s) 414 to the body of the vehicle 402.

In at least one example, the localization component 420, the perception component 422, the one or more maps 424, the one or more system controllers 426, the planning component 428, the latency determination component 430, the safety distance component 432, and the prediction component 434 can process sensor data, as described above, and can send their respective outputs, over the one or more network(s) 436, to one or more computing device(s) 438. In at least one example, the localization component 420, the perception component 422, the one or more maps 424, the one or more system controllers 426, the planning component 428, the latency determination component 430, the safety distance component 432, and the prediction component 434 can send their respective outputs to the one or more computing device(s) 438 at a particular frequency, after a lapse of a predetermined period of time, in near real-time, etc.

In some examples, the vehicle 402 can send sensor data to one or more computing device(s) 438 via the network(s) 436. In some examples, the vehicle 402 can send raw sensor data to the computing device(s) 438. In other examples, the vehicle 402 can send processed sensor data and/or representations of sensor data to the computing device(s) 438. In some examples, the vehicle 402 can send sensor data to the computing device(s) 438 at a particular frequency, after a lapse of a predetermined period of time, in near real-time, etc. In some cases, the vehicle 402 can send sensor data (raw or processed) to the computing device(s) 438 as one or more log files.

The computing device(s) 438 can include processor(s) 440 and a memory 442 storing a training component 444.

In some instances, the training component 444 can include functionality to train one or more models to detect objects in an environment, predict object behavior, and the like. For instance, aspects of some or all of the components discussed herein can include any models, algorithms, and/or machine learning algorithms. For example, in some instances, the components in the memory 442 (and the memory 418, discussed above) can be implemented as a neural network. In some examples, the training component 444 can utilize a neural network to generate and/or execute one or more models to improve various aspects of object behavior prediction for use in trajectory planning of the vehicle 402.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 416 of the vehicle 402 and the processor(s) 440 of the computing device(s) 438 can be any suitable processor capable of executing instructions to process data and perform operations as described herein. By way of example and not limitation, the processor(s) 416 and 440 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 418 and 442 are examples of non-transitory computer-readable media. The memory 418 and 442 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the computing device(s) 438 and/or components of the computing device(s) 438 can be associated with the vehicle 402. That is, the vehicle 402 can perform one or more of the functions associated with the computing device(s) 438, and vice versa. Further, aspects of the planning component 428 and/or the perception component 422 can be performed on any of the devices discussed herein. For example, any or all of the functionality and components described with reference to FIGS. 1-4 can be implemented by the planning component 428 or other components of vehicle 402.

Figure 5:
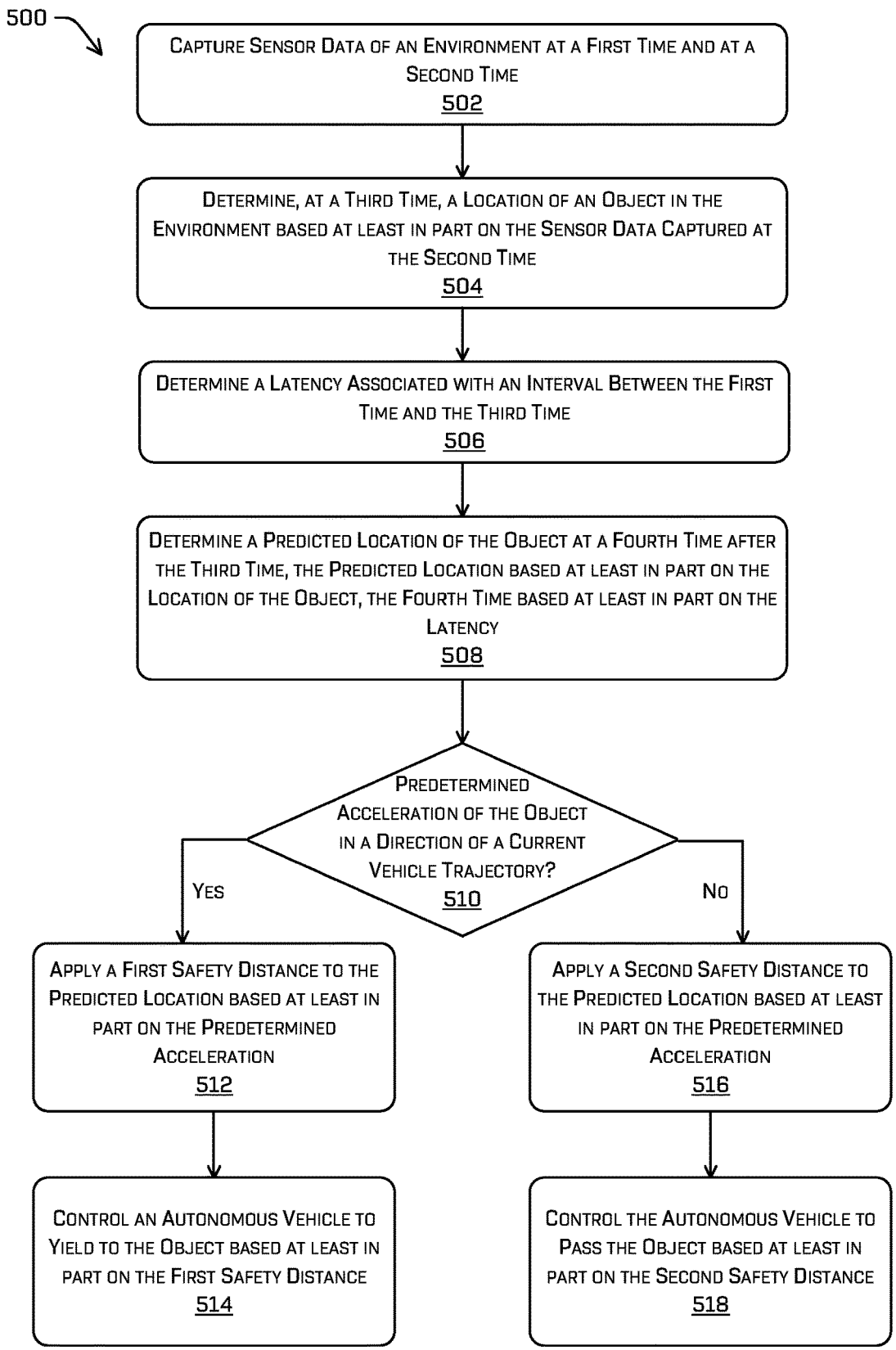
FIG. 5 depicts an example process for determining a predicted location of an object at a future time based on a latency of a system, and using the predicted location and a predetermined acceleration to control whether a vehicle yields to the object or circumvents the object, in accordance with examples of the disclosure.

FIG. 5 depicts an example process for determining a predicted location of an object at a future time based on a latency of a system, and using the predicted location and a predetermined acceleration to control whether a vehicle yields to the object or circumvents the object, in accordance with examples of the disclosure. For example, some or all of the process 500 can be performed by one or more components in FIG. 4, as described herein. For example, some or all of the process 500 can be performed by the vehicle computing device(s) 404, the computing device(s) 438, or any other computing device or combination of computing devices. Further, any of the operations described in the example process 500 may be executed in parallel, in a different order than depicted in the process 500, omitted, combined with other processes, and the like.

An operation 502 includes capturing sensor data of an environment at a first time and at a second time. In examples, sensors such as lidar sensors, radar sensors, time of flight sensors, and the like may be included on the vehicle, which capture corresponding types of sensor data as the vehicle traverses the environment.

An operation 504 includes determining, at a third time, a location of an object in the environment based at least in part on the sensor data captured at the second time. In some examples, the perception component 422 may use the sensor data to detect an object in the environment, along with determining an object type of the object, a speed or velocity of the object from the first time $T_1$ to the second time $T_2$, characteristics of the object, a location of the object relative to the vehicle or landmarks in the environment at the second time $T_2$, and so forth.

An operation 506 includes determining a latency associated with an interval between the first time and the third time. For example, a latency determination component (e.g., the latency determination component 218 of FIG. 2 and/or the latency determination component 318 of FIG. 3) of the vehicle may receive an indication of the first time $T_1$ and a time at which the batch of information is received from the perception component, which may take the form of time stamps for the first time $T_1$ and the third time, and/or a time interval between the first time $T_1$ and the third time. The latency determination component may output a latency based at least in part on the indication of the first time $T_1$ and the third time. In some cases, the latency determination component may take into account one or more additional time intervals (e.g., prior to the time $T_1$) when determining the latency. For instance, the latency determination component may average two or more time intervals (e.g., including the interval between the first time $T_1$ and the third time) to determine the latency.

An operation 508 includes determining a predicted location of the object at a fourth time after the third time, where the predicted location is based at least in part on the location of the object, and the fourth time is based at least in part on the latency. For instance, a safety distance component (e.g., the safety distance component 222 of FIG. 2 and/or the safety distance component 322 of FIG. 3) may predict that the next batch of information will be received from the perception system at a same (or similar) interval after the third time as the interval between the time $T_1$ and the third time. Alternatively or additionally, the safety distance component may determine that the latency is likely to increase based on a number of objects in the environment and/or a complexity of the environment as described above, and adjust the predicted time that the next batch of information will be received accordingly. The safety distance component may extrapolate information received from the perception system about the object 110 at the times $T_1$ and $T_2$ to predict a location and/or velocity of the object at the predicted future time that the next batch of information will be received from the perception system.

An operation 510 includes determining whether a predetermined acceleration of the object is in a direction of a current vehicle trajectory. For example, the safety distance component may predict a trajectory of the object based on a location and/or a velocity of the object at the time $T_2$. The safety distance component may then apply a predetermined acceleration to the trajectory of the object, and determine whether the predetermined trajectory is in a direction of the current trajectory of the vehicle (e.g., intersects and/or will intersect the trajectory of the vehicle if continued by the object). In some examples, the predetermined trajectory may be based on an object type of the object, as described in relation to FIG. 1.

If the predetermined acceleration of the object is in the direction of the current vehicle trajectory, the process may proceed to operation 512, in which a first safety distance is applied to the predicted location based at least in part on the predetermined acceleration. In some cases, the safety distance component may determine the first safety distance by applying a safety factor to the predetermined acceleration and in a direction of a determined velocity of the object. For instance, a safety factor of 2 may be applied to a predetermined acceleration for a pedestrian object type, to further decrease the likelihood that a collision may occur with the object. The safety distance component may apply the safety distance in a direction of the trajectory of the object, e.g., towards the current trajectory of the vehicle.

An operation 514 includes controlling an autonomous vehicle to yield to the object based at least in part on the first safety distance. In some examples, the safety distance component may update the trajectory such that the vehicle stops and/or slows down to avoid intersecting the safety distance from the predicted location of the object. In this way, even if the object accelerates along a trajectory towards the current trajectory of the object, the vehicle will have sufficient time to yield to the object. Additionally, because the trajectory is updated based, in part, on the latency, the vehicle will yield earlier in scenarios where latency of the system is greater.

If the predetermined acceleration of the object is not in the direction of the current vehicle trajectory, the process may proceed to operation 516, in which a second safety distance is applied to the predicted location based at least in part on the predetermined acceleration. In some examples, the safety distance component may determine the second safety distance by applying a safety factor to the predetermined acceleration in a radius extending from the predicted location of the object. For instance, a safety factor of 2 may be applied to a predetermined acceleration for a pedestrian object type, to further decrease the likelihood that a collision may occur with the object.

An operation 518 includes controlling the autonomous vehicle to pass the object based at least in part on the second safety distance. In some examples, the safety distance component may update the trajectory such that the vehicle circumvents the safety distance to avoid a collision with the object, should the object accelerate in any one of multiple directions. In this way, even if the object accelerates in a direction not predicted by the perception system and in between the planning system receiving batches of information regarding the object, the vehicle will pass around the object with significantly reduced likelihood of collision than in previous techniques. Additionally, because the trajectory is updated based, in part, on the latency, the vehicle will begin to pass the object earlier and/or supply additional space when passing the object in scenarios where latency of the system is greater.

EXAMPLE CLAUSES

A: A system comprising: one or more processors; and one or more computer-readable media storing instructions executable by the one or more processors, wherein the instructions, when executed, cause the system to perform operations comprising: receiving first sensor data of an environment at a first time; determining, at a second time and based at least in part on the first sensor data, a first location of an object in the environment; determining, as a latency, a difference between the first time and the second time; receiving second sensor data; determining, based at least in part on the second sensor data, a predicted location of the object; determining, based at least in part on a predetermined acceleration associated with the object and the latency, a safety distance; and controlling an autonomous vehicle based at least in part on the safety distance and the predicted location of the object.

B: The system of paragraph A, wherein the predetermined acceleration is based at least in part on an object type associated with the object, wherein applying the safety distance is further based on the predetermined acceleration being in a direction of a current trajectory the autonomous vehicle, and wherein controlling the autonomous vehicle comprises altering the current trajectory to an updated trajectory based at least in part on the predetermined acceleration being in the direction of the current trajectory the autonomous vehicle.

C: The system of paragraph A or B, wherein the latency is based at least in part on an average of previously determined latencies, the average being determined based at least in part on the latency.

D: The system of any of claims A-C, wherein applying the safety distance is further based on a direction of the predetermined acceleration relative to a current trajectory the autonomous vehicle, and wherein controlling the autonomous vehicle comprises altering the current trajectory to an updated trajectory based at least in part on the direction of the predetermined acceleration relative to the current trajectory the autonomous vehicle.

E: The system of any of claims A-D, wherein the latency is based on a number of additional objects detected in the environment.

F: A method comprising: receiving first sensor data of an environment at a first time; determining, at a second time and based at least in part on the first sensor data, a characteristic of an object in the environment comprising one or more of a location or a velocity of the object; determining a latency associated with an interval between the first time and the second time; receiving second sensor data; determining, based at least in part on the second sensor data, a second characteristic of the object; determining, based at least in part on an object type and the latency, a safety distance associated with the object; and controlling a vehicle based at least in part on the safety distance applied and the second characteristic.

G: The method of paragraph F, further comprising: determining, based at least in part on the object type, a predetermined acceleration associated with the object, wherein controlling the vehicle is based at least in part on the predetermined acceleration.

H: The method of paragraph G, wherein the object comprises a pedestrian and wherein the predetermined acceleration comprises a uniform acceleration in multiple directions.

I: The method of paragraph G or H, wherein applying the safety distance is further based on the predetermined acceleration being in a direction of a current trajectory the vehicle, and wherein controlling the vehicle comprises altering the current trajectory to an updated trajectory based at least in part on the predetermined acceleration being in the direction of the current trajectory the vehicle.

J: The method of any of claims G-I, wherein object comprises a bicyclist and wherein the predetermined acceleration is in a direction along a current trajectory of the bicyclist.

K: The method of any of claims G-J, wherein applying the safety distance is further based on a direction of the predetermined acceleration relative to a current trajectory the vehicle, and wherein controlling the vehicle comprises altering the current trajectory to an updated trajectory based at least in part on the direction of the predetermined acceleration relative to the current trajectory the vehicle.

L: The method of paragraph K, wherein the latency is a first latency and the current trajectory is based at least in part on a first passing distance around the location of the object, the method further comprising: determining a second latency associated with an interval between a fourth time and the first time, the first time being after the fourth time and used to determine the current trajectory; and determining that the first latency is greater than the second latency, wherein the updated trajectory is further based on the first latency being greater than the second latency and causes the vehicle to alter the first passing distance to a second passing distance, the second passing distance being greater than the first passing distance.

M: The method of any of claims F-L, wherein determining the latency is based at least in part on determining an average of multiple previous latencies.

N: The method of any of claims F-M, further comprising determining a number of objects in the environment, wherein the latency is based at least in part on the number of objects in the environment.

O: The method of any of claims F-N, further comprising: generating a trajectory for the vehicle based at least in part on the safety distance, wherein controlling the vehicle is based at least in part on the trajectory, and wherein determining the latency is based at least in part on a first predicted latency to generate the trajectory or a second predicted latency to control the vehicle to execute the trajectory.

P: One or more computer-readable media storing instructions that, when executed by one or more processors, cause the one or more processors to perform operations comprising: receiving first sensor data of an environment at a first time; determining, at a second time and based at least in part on the first sensor data, a characteristic of an object in the environment comprising one or more of a location or a velocity of the object; determining a latency associated with an interval between the first time and the second time; receiving second sensor data; determining, based at least in part on the second sensor data, a second characteristic of the object; determining, based at least in part on an object type and the latency, a safety distance associated with the object; and controlling a vehicle based at least in part on the safety distance applied and the second characteristic.

Q: The one or more computer-readable media of paragraph P, wherein applying the safety distance is further based on a direction of a predetermined acceleration of the object relative to a current trajectory the vehicle, and wherein controlling the vehicle comprises altering the current trajectory to an updated trajectory based at least in part on the direction of the predetermined acceleration relative to the current trajectory the vehicle.

R: The one or more computer-readable media of paragraph P or Q, wherein determining the latency is based at least in part on determining an average of multiple previous latencies.

S: The one or more computer-readable media of any of claims P-R, wherein the latency is a first latency, the operations further comprising: determining a current trajectory for the vehicle based at least in part on a first passing distance around the location of the object; determining a second latency associated with an interval between a fourth time and the first time, the first time being after the fourth time and used to determine the current trajectory; determining that the first latency is greater than the second latency; and determining an updated trajectory based at least in part on the first latency being greater than the second latency, wherein the updated trajectory causes the vehicle to alter the first passing distance to a second passing distance, the second passing distance being greater than the first passing distance.

T: The one or more computer-readable media of any of claims P-S, further comprising determining a number of objects in the environment, wherein the latency is based at least in part on the number of objects in the environment.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
  receiving first sensor data of an environment at a first time;
  determining, at a second time and based at least in part on the first sensor data, a first location of an object in the environment;
  determining, as a first latency, a difference between the first time and the second time, and averaging the first latency with one or more previously determined latencies, to obtain an average latency;
  receiving second sensor data;
  determining, based at least in part on the second sensor data, a predicted location of the object;
  determining, based at least in part on a predetermined acceleration associated with the object and the average latency, a safety distance;
  generating a trajectory for an autonomous vehicle based at least in part on the safety distance, wherein the first latency is determined based at least in part on a first predicted latency to generate the trajectory or a second predicted latency to control the autonomous vehicle to execute the trajectory; and
  controlling the autonomous vehicle based at least in part on the trajectory and the predicted location of the object.

2. The system of claim 1, wherein the predetermined acceleration is based at least in part on an object type associated with the object,
wherein applying the safety distance is further based on the predetermined acceleration being in a direction of a current trajectory the autonomous vehicle, and
wherein controlling the autonomous vehicle comprises altering the current trajectory to an updated trajectory based at least in part on the predetermined acceleration being in the direction of the current trajectory the autonomous vehicle.

3. The system of claim 1, wherein applying the safety distance is further based on a direction of the predetermined acceleration relative to a current trajectory the autonomous vehicle, and
wherein controlling the autonomous vehicle comprises altering the current trajectory to an updated trajectory based at least in part on the direction of the predetermined acceleration relative to the current trajectory the autonomous vehicle.

4. The system of claim 1, wherein the first latency is based on a number of additional objects detected in the environment.

5. A method comprising:
receiving first sensor data of an environment at a first time;
determining, at a second time and based at least in part on the first sensor data, a characteristic of an object in the environment comprising one or more of a location or a velocity of the object;
determining a first latency associated with an interval between the first time and the second time, and averaging the first latency with one or more previously determined latencies, to obtain an average latency;
receiving second sensor data;
determining, based at least in part on the second sensor data, a second characteristic of the object;
determining, based at least in part on an object type and the average latency, a safety distance associated with the object;
generating a trajectory for a vehicle based at least in part on the safety distance, wherein the first latency is determined based at least in part on a first predicted latency to generate the trajectory or a second predicted latency to control the vehicle to execute the trajectory; and
controlling the vehicle based at least in part on the trajectory applied and the second characteristic.

6. The method of claim 5, further comprising:
determining, based at least in part on the object type, a predetermined acceleration associated with the object, wherein controlling the vehicle is based at least in part on the predetermined acceleration.

7. The method of claim 6, wherein the object comprises a pedestrian and wherein the predetermined acceleration comprises a uniform acceleration in multiple directions.

8. The method of claim 6, wherein applying the safety distance is further based on the predetermined acceleration being in a direction of a current trajectory the vehicle, and
wherein controlling the vehicle comprises altering the current trajectory to an updated trajectory based at least in part on the predetermined acceleration being in the direction of the current trajectory the vehicle.

9. The method of claim 6, wherein object comprises a bicyclist and wherein the predetermined acceleration is in a direction along a current trajectory of the bicyclist.

10. The method of claim 6, wherein applying the safety distance is further based on a direction of the predetermined acceleration relative to a current trajectory the vehicle, and
wherein controlling the vehicle comprises altering the current trajectory to an updated trajectory based at least in part on the direction of the predetermined acceleration relative to the current trajectory the vehicle.

11. The method of claim 10, wherein the current trajectory is based at least in part on a first passing distance around the location of the object, the method further comprising:

determining a second latency associated with an interval between a fourth time and the first time, the first time being after the fourth time and used to determine the current trajectory; and
determining that the first latency is greater than the second latency,
wherein the updated trajectory is further based on the first latency being greater than the second latency and causes the vehicle to alter the first passing distance to a second passing distance, the second passing distance being greater than the first passing distance.

12. The method of claim 5, further comprising determining a number of objects in the environment,
wherein the first latency is based at least in part on the number of objects in the environment.

13. One or more non-transitory computer-readable media storing instructions that, when executed by one or more processors, cause the one or more processors to perform operations comprising:
receiving first sensor data of an environment at a first time;
determining, at a second time and based at least in part on the first sensor data, a characteristic of an object in the environment comprising one or more of a location or a velocity of the object;
determining a first latency associated with an interval between the first time and the second time, and averaging the first latency with one or more previously determined latencies, to obtain an average latency;
receiving second sensor data;
determining, based at least in part on the second sensor data, a second characteristic of the object;
determining, based at least in part on an object type and the average latency, a safety distance associated with the object;
generating a trajectory for a vehicle based at least in part on the safety distance, wherein the first latency is determined based at least in part on a first predicted latency to generate the trajectory or a second predicted latency to control the vehicle to execute the trajectory; and
controlling the vehicle based at least in part on the trajectory applied and the second characteristic.

14. The one or more non-transitory computer-readable media of claim 13, wherein applying the safety distance is further based on a direction of a predetermined acceleration of the object relative to a current trajectory the vehicle, and
wherein controlling the vehicle comprises altering the current trajectory to an updated trajectory based at least in part on the direction of the predetermined acceleration relative to the current trajectory the vehicle.

15. The one or more non-transitory computer-readable media of claim 13, the operations further comprising:
determining a current trajectory for the vehicle based at least in part on a first passing distance around the location of the object;
determining a second latency associated with an interval between a fourth time and the first time, the first time being after the fourth time and used to determine the current trajectory;
determining that the first latency is greater than the second latency; and
determining an updated trajectory based at least in part on the first latency being greater than the second latency, wherein the updated trajectory causes the vehicle to alter the first passing distance to a second passing distance, the second passing distance being greater than the first passing distance.

16. The one or more non-transitory computer-readable media of claim 13, further comprising determining a number of objects in the environment,
   wherein the first latency is based at least in part on the number of objects in the environment.

17. The system of claim 1, wherein the object comprises a pedestrian and wherein the predetermined acceleration comprises a uniform acceleration in multiple directions.

18. The system of claim 1, wherein object comprises a bicyclist and wherein the predetermined acceleration is in a direction along a current trajectory of the bicyclist.

19. The one or more non-transitory computer-readable media of claim 14, wherein the object comprises a pedestrian and wherein the predetermined acceleration comprises a uniform acceleration in multiple directions.

20. The one or more non-transitory computer-readable media of claim 14, wherein object comprises a bicyclist and wherein the predetermined acceleration is in a direction along a current trajectory of the bicyclist.

\* \* \* \* \*